US012205730B2

(12) United States Patent
Aoyama et al.

(10) Patent No.: US 12,205,730 B2
(45) Date of Patent: Jan. 21, 2025

(54) CONDUCTIVE WIRE, METHOD FOR MANUFACTURING CONDUCTIVE WIRE, CASTING CONDUCTIVE WIRE, CABLE AND METHOD FOR MANUFACTURING CABLE

(71) Applicant: Hitachi Metals, Ltd., Tokyo (JP)

(72) Inventors: Seigi Aoyama, Tokyo (JP); Toru Sumi, Tokyo (JP); Takashi Hayasaka, Tokyo (JP); Ryohei Okada, Tokyo (JP); Detian Huang, Tokyo (JP); Tamotsu Sakurai, Tokyo (JP); Satoshi Yajima, Hitachi (JP); Minoru Takatsuto, Hitachi (JP); Hiroshi Bando, Hitachi (JP)

(73) Assignee: Proterial, Ltd., Tokyo (JP)

( * ) Notice: Subject to any disclaimer, the term of this patent is extended or adjusted under 35 U.S.C. 154(b) by 415 days.

(21) Appl. No.: 16/775,428

(22) Filed: Jan. 29, 2020

(65) Prior Publication Data

US 2020/0168355 A1 May 28, 2020

Related U.S. Application Data

(62) Division of application No. 15/723,643, filed on Oct. 3, 2017, now Pat. No. 10,720,258.

(30) Foreign Application Priority Data

Jan. 10, 2017 (JP) ................................ 2017-002192

(51) Int. Cl.
*H01B 1/02* (2006.01)
*B22D 11/00* (2006.01)
(Continued)

(52) U.S. Cl.
CPC ........... *H01B 1/026* (2013.01); *B22D 11/003* (2013.01); *C22F 1/08* (2013.01); *H01B 11/1808* (2013.01); *H01B 13/0162* (2013.01)

(58) Field of Classification Search
CPC ..................................................... H01B 1/026
See application file for complete search history.

(56) References Cited

U.S. PATENT DOCUMENTS 5,077,005 A * 12/1991 Kato ...................... H01B 1/026 420/500
5,833,920 A * 11/1998 Nakanishi .............. H01L 24/48 420/481
(Continued)

FOREIGN PATENT DOCUMENTS

CN 102869805 A 1/2013
CN 103117116 * 5/2013
(Continued)

OTHER PUBLICATIONS

Yoshikazu Sakai et al. "Development of High-strength and high-conductivity Cu—Ag alloy", Journal of the Japan Institute of Metals and Materials, vol. 55, No. 12 (1991), p. 1382-1391.
(Continued)

*Primary Examiner* — Chau N Nguyen
(74) *Attorney, Agent, or Firm* — Studebaker & Brackett PC

(57) ABSTRACT

A method for manufacturing a conductive wire includes conducting a continuous casting of a conductive alloy material at a casting rate of not less than 40 mm/min and not more than 200 mm/min to form a conductive wire with a primary diameter, the conductive alloy material containing not more than 1.0 mass % of an added metal element, reducing a diameter of the conductive wire with the primary diameter to form a conductive wire with a secondary diameter, heat treating the conductive wire with the secondary diameter so that tensile strength thereof is reduced to not less than 90% and less than 100% of tensile strength before the heat treating, and reducing a diameter of the conductive wire with the secondary diameter and the reduced tensile strength to
(Continued)

generate a logarithmic strain of 7.8 to 12.0 therein to form a conductive wire with a tertiary diameter.

9 Claims, 5 Drawing Sheets

(51) Int. Cl.
*C22F 1/08* (2006.01)
*H01B 11/18* (2006.01)
*H01B 13/016* (2006.01)

(56) References Cited

U.S. PATENT DOCUMENTS

| | | | | |
|---|---|---|---|---|
| 6,417,445 | B1 | 7/2002 | Sato et al. | |
| 9,163,300 | B2 | 10/2015 | Oishi | |
| 9,512,506 | B2 | 12/2016 | Oishi et al. | |
| 2002/0066503 | A1 | 6/2002 | Matsui et al. | |
| 2004/0187977 | A1 | 9/2004 | Matsui et al. | |
| 2007/0029290 | A1 * | 2/2007 | Kehrer | B23K 26/60 219/121.64 |
| 2013/0022831 | A1 | 1/2013 | Sagawa et al. | |
| 2013/0048162 | A1 | 2/2013 | Ito et al. | |
| 2014/0096877 | A1 | 4/2014 | Maki et al. | |
| 2014/0283962 | A1 | 9/2014 | Ito et al. | |
| 2016/0160321 | A1 | 6/2016 | Ito et al. | |
| 2018/0322979 | A1 * | 11/2018 | Sekiya | H01B 13/0016 |

FOREIGN PATENT DOCUMENTS

| | | | | |
|---|---|---|---|---|
| CN | 106244844 | | * | 12/2016 |
| JP | 2000-199042 | A | | 7/2000 |
| JP | 2001-023456 | A | | 1/2001 |
| JP | 2002-121629 | A | | 4/2002 |
| JP | 2010-177055 | A | | 8/2010 |
| JP | 2010-177056 | A | | 8/2010 |
| JP | 2011-246802 | A | | 12/2011 |
| JP | 2013-216979 | A | | 10/2013 |
| JP | 2015-021138 | A | | 2/2015 |
| WO | WO 2012/035862 | | * | 3/2012 |

OTHER PUBLICATIONS

Office Action issued in the corresponding Chinese Application No. 201710935423.6 on May 12, 2020.

Office Action issued in the corresponding Japanese Patent Application No. 2020-160337 on Jun. 24, 2021.

* cited by examiner

| SAMPLE | | | | CROSS SECTION | |
|---|---|---|---|---|---|
| No. | CASTING METHOD | Ag CONCENTRATION (mass%) | CASTING RATE (mm/min) | FRONT END | BACK END |
| 1 | A | 2 | 100 |  |  |
| 2 | A | 1 | 100 |  |  |
| 3 | A | 0.75 | 44 |  |  |
| 4 | A | 0.75 | 100 |  |  |
| 5 | A | 0.75 | 170 |  |  |
| 6 | B | 0.75 | 3600 |  | - |

CONDUCTIVE WIRE, METHOD FOR MANUFACTURING CONDUCTIVE WIRE, CASTING CONDUCTIVE WIRE, CABLE AND METHOD FOR MANUFACTURING CABLE

The present application is based on Japanese patent application No. 2017-002192 filed on Jan. 10, 2017, the entire contents of which are incorporated herein by reference.

BACKGROUND OF THE INVENTION

1. Field of the Invention

The invention relates to a conductive wire, a method for manufacturing the conductive wire, a casting conductive wire, a cable and a method for manufacturing the cable.

2. Description of the Related Art

A Cu—Ag alloy has been suggested as a material of ultra-fine wires used to form conductors of electric wires or cables for electric devices (see JP 2010/177055, JP 2010/177056, JP 2013/216979, JP 2015/21138 and JP 2002/121629).

Table 1 below shows conductivity, tensile strength and Ag concentration of the ultra-fine wires described in Examples of JP 2010/177055, JP 2010/177056, JP 2013/216979, JP 2015/21138 and JP 2002/121629.

TABLE 1

| Patent Literature | Conductivity (% IACS) | Tensile strength (MPa) | Ag concentration (mass %) |
|---|---|---|---|
| JP 2010/177055 | 85 | 950 to 955 | 0.6 |
| JP 2010/177056 | 85 | 904 to 910 | 0.6 |
| JP 2013/216979 | 85 | 900 | 0.6 |
| JP 2015/21138 | 91.5 to 92.8 | 699 to 798 | 0.6 |
| JP 2002/121629 | 64 to 84 | 1030 to 1290 | 2 to 5 |

Also, JP 2001/23456 discloses an ultra-fine wire which is used as a center conductor of coaxial cable. This ultra-fine wire is formed of a Cu—Ag alloy with an Ag concentration of not less than 2 weight % and not more than 10 weight % and has a conductivity of 60 to 90% IACS and a tensile strength of 120 to 160 kgf/mm$^2$.

Furthermore, Non-Patent Literature "Development of High-strength and high-conductivity Cu—Ag alloy", Yoshikazu Sakai and three others, Journal of the Japan Institute of Metals and Materials, vol. 55, No. 12 (1991), p. 1382-1391, suggests that Ag is inserted into molten Cu in a crucible to obtain an ingot which is then drawn and heat-treated to form a wire-shaped Cu—Ag alloy with an Ag concentration of not less than 2 at % and not more than 60 at %. The Non-Patent Literature describes that an appropriate Ag concentration of the Cu—Ag alloy to obtain tensile strength of 1000 MPa and conductivity of 80% IACS is not less than 10 at % and not more than 16 at %.

SUMMARY OF THE INVENTION

Recently, conductive materials for medical use or for household electrical appliance are increasingly required to have higher conductivity and higher tensile strength than before, and there is a demand for conductive wires with, e.g., a conductivity of not less than 88% IACS and a tensile strength of not less than 800 MPa. Also, as for an alloy constituting a conductive material such as ultra-fine wire, it is desired to reduce (e.g., to not more than 1 mass % as the concentration of the added metal element) the amount of a metal element such as Ag added to a main metal element such as Cu.

However, as described above, none of the Cu—Ag alloys described in the documents mentioned above satisfies (or achieves) an Ag concentration of not more than 1 mass %, a conductivity of not less than 88% IACS and a tensile strength of not less than 800 MPa.

It is an object of the invention to provide a conductive wire that has a conductivity of not less than 88% IACS and a tensile strength of not less than 800 MPa while allowing a low concentration of a metal element added to a main metal element in an alloy constituting a conductive material, as well as a method for manufacturing the conductive wire, a casting conductive wire used to obtain the conductive wire, a cable and a method for manufacturing the cable.

According to an embodiment of the invention, a method for manufacturing a conductive wire, a conductive wire, a casting conductive wire, a method for manufacturing a cable and a cable below are provided.

[1] A method for manufacturing a conductive wire, comprising:

conducting a continuous casting of a conductive alloy material at a casting rate of not less than 40 mm/min and not more than 200 mm/min to form a conductive wire with a primary diameter, the conductive alloy material containing not more than 1.0 mass % of an added metal element;

reducing a diameter of the conductive wire with the primary diameter to form a conductive wire with a secondary diameter;

heat treating the conductive wire with the secondary diameter so that tensile strength thereof is reduced to not less than 90% and less than 100% of tensile strength before the heat treating; and reducing a diameter of the conductive wire with the secondary diameter and the reduced tensile strength to generate a logarithmic strain of 7.8 to 12.0 therein to form a conductive wire with a tertiary diameter.

[2] The method according to [1], wherein the heat treatment is performed such that a diffraction image with a circular spot is observed in a metal structure of the conductive wire with secondary diameter.

[3] The method according to [1] or [2], wherein the conductive alloy material comprises a copper-based alloy material, a silver-based alloy material or a nickel-based alloy material.

[4] The method according to [3], wherein the copper-based material comprises a Cu—Ag alloy, a Cu—Sn alloy, a Cu—Sn—In alloy, a Cu—Sn—Mg alloy or a Cu—Mg alloy.

[5] The method according to [3], wherein the silver-based material comprises an Ag—Cu alloy.

[6] The method according to [3], wherein the nickel-based material comprises a Ni—Cu alloy.

[7] The method according to any one of [1] to [6, wherein the tertiary diameter is not less than 13 μm and not more than 40 μm.

[8] A conductive wire, comprising: a Cu—Ag alloy with an Ag concentration of not less than 0.5 mass % and not more than 1.0 mass %;

a conductivity of not less than 88% IACS; and a tensile strength of not less than 800 MPa.

[9] A casting conductive wire, comprising a Cu—Ag alloy with an Ag concentration of not less than 0.5 mass % and not more than 1.0 mass %; and a mesh structure in a cross section thereof.

[10] A cable, comprising the conductive wire according to [8].

[11] A method for manufacturing a cable, comprising a conductive wire that is manufactured by the method according to any one of [1] to [7].

Effects of the Invention

According to an embodiment of the invention, a conductive wire that has a conductivity of not less than 88% IACS and a tensile strength of not less than 800 MPa while allowing a low concentration of a metal element added to a main metal element in an alloy constituting a conductive material, as well as a method for manufacturing the conductive wire, a casting conductive wire used to obtain the conductive wire, a cable and a method for manufacturing the cable.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

Method for Manufacturing a Conductive Wire

A method for manufacturing a conductive wire in an embodiment of the invention includes forming a conductive wire with primary diameter by a continuous casting of a conductive alloy material at a casting rate of not less than 40 mm/min and not more than 200 mm/min and obtaining a conductive wire with secondary diameter by reducing a diameter of the conductive wire with primary diameter, the conductive alloy material containing not more than 1.0 mass % of an added metal element, performing heat treatment on the conductive wire with secondary diameter so that tensile strength is reduced to not less than 90% and less than 100% of the tensile strength before the heat treatment, and reducing a diameter of the conductive wire with secondary diameter after reducing tensile strength by processing to a logarithmic strain of 7.8 to 12.0, thereby obtaining a conductive wire with tertiary diameter. The embodiment of the invention will be described in details below.

Figure 1:
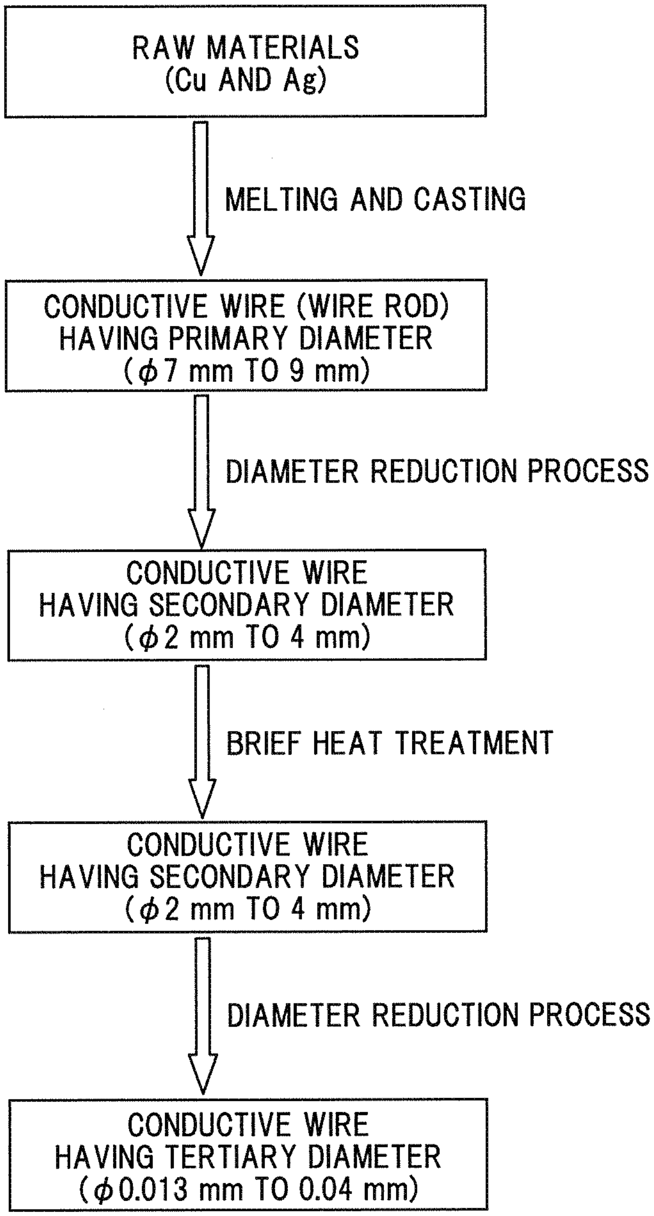
FIG. 1 is an explanatory diagram illustrating a workflow to perform a method for manufacturing a conductive wire in an embodiment of the present invention.

FIG. 1 is an explanatory diagram illustrating a workflow to perform a method for manufacturing a conductive wire in the embodiment of the invention.

The conductive alloy material can be any conductive alloy materials, and it is preferable to use conductive non-ferrous metals, particularly a copper-based alloy material, a silver-based alloy material and a nickel-based alloy material. The conductive alloy material contains not more than 1.0 mass % of an added metal element. A conductive material with a combination of a solid solution metal and another solid solution metal (solid-solution-type alloy) is suitable but a precipitation-type alloy can be also used. Examples of the added metal element contained in the conductive alloy material include Ag, Sn, In and Mg, etc. These metal elements are constituents of a solid-solution-type alloy when added at a low concentration within the range of not more than 1.0 mass %, and are constituents of a precipitation-type alloy when added at a high concentration.

Examples of preferable copper-based alloy material include the solid-solution-type of Cu—Ag alloy, Cu—Sn alloy, Cu—Sn—In alloy, Cu—Sn—Mg alloy and Cu—Mg alloy. Of those, the Cu—Ag alloy is particularly preferably. In these copper-based alloy materials, a metal element such as Ag, Sn, In or Mg is added at a concentration of not more than 1.0 mass % to, e.g., tough pitch copper, oxygen-free copper or high-purity copper (pure copper with a purity of not less than 99.9999%). Conductivity is about several % higher when using high-purity copper as the copper-based alloy than when using the tough pitch copper or oxygen-free copper.

The Cu—Ag alloy preferably contains Ag at a concentration of not less than 0.5 mass % and not more than 1.0 mass %, and the balance composed of Cu and inevitable impurities. A Cu—Ag alloy with an Ag concentration of not less than 0.6 mass % and not more than 0.9 mass % is more preferable, and a Cu—Ag alloy with an Ag concentration of not less than 0.7 mass % and not more than 0.8 mass % is further preferable. When the Ag concentration is more than 1 mass %, conductivity of not less than 88% IACS may not be achieved and it is economically inefficient since the used amount of Ag is larger. When the Ag concentration is less than 0.5 mass %, tensile strength of not less than 800 MPa may not be achieved.

As the silver-based alloy material, a solid-solution-type Ag—Cu alloy is preferable.

As the nickel-based alloy material, a solid-solution-type Ni—Cu alloy is preferable.

Casting Process

In the casting process, the conductive alloy material described above is prepared and is then subjected to a continuous casting at a predetermined casting rate into a conductive wire (also called a wire rod or casting conductive wire) with primary diameter. The predetermined casting rate is not less than 40 mm/min and not more than 200 mm/min, preferably not less than 40 mm/min and not more than 190 mm/min. The casting method is not specifically limited but is preferably continuous casting. The continuous casting method can be continuous casting-and-rolling. The continuous casting method when used may be either vertical casting or horizontal casting. The primary diameter is, e.g., φ7 mm to 9 mm

Initial Diameter Reduction Process

In the initial diameter reduction process, the conductive wire with primary diameter obtained through the casting process is processed by cold drawing, hot drawing, warm drawing or cold rolling, etc., to reduce the diameter, and a conductive wire with secondary diameter is thereby obtained. The secondary diameter is, e.g., φ2 mm to 4 mm

Heat Treatment Process

In the heat treatment process, a predetermined heat treatment is performed on the conductive wire with secondary diameter obtained through the initial diameter reduction process. The conditions for the predetermined heat treatment are, e.g., 450° C. to 550° C. for a short period of time (e.g., not less than 2 seconds and not more than 10 seconds). The conditions for the predetermined heat treatment performed on the conductive wire with secondary diameter only needs to be heat treatment conditions under which the conductive wire with secondary diameter does not soften. For example, heat treatment can be performed at a higher temperature and a shorter time (e.g., 900° C. and not more than 1 second) in view of reducing the cost, or at a lower temperature and a longer time, than the above-described heat treatment conditions within the range in which the conductive wire with secondary diameter does not soften. That is, in this heat treatment process, the conductive wire with secondary diameter is heat-treated to promote rearrangement of dislocations which are formed in the conductive wire with secondary diameter due to the initial diameter reduction process, etc. In this heat treatment, conductivity of the conductive wire with secondary diameter is recovered by 1% to 3%. Also in this heat treatment, tensile strength of the conductive wire with secondary diameter is reduced to not less than 90% and less than 100% of the tensile strength before the heat treatment. The tensile strength is preferably reduced to not less than 92% and less than 100% of the tensile strength before the heat treatment, more preferably not less than 95% and less than 100% of the tensile strength before the heat treatment. The heat treatment conditions here are different from those for conventional recrystallization in which tensile strength is reduced by, e.g., about 50% to remove strain. When heat treatment to reduce tensile strength by about 50% is performed for the purpose of recrystallization, it is presumed that tensile strength is less than 800 MPa.

Figure 2:
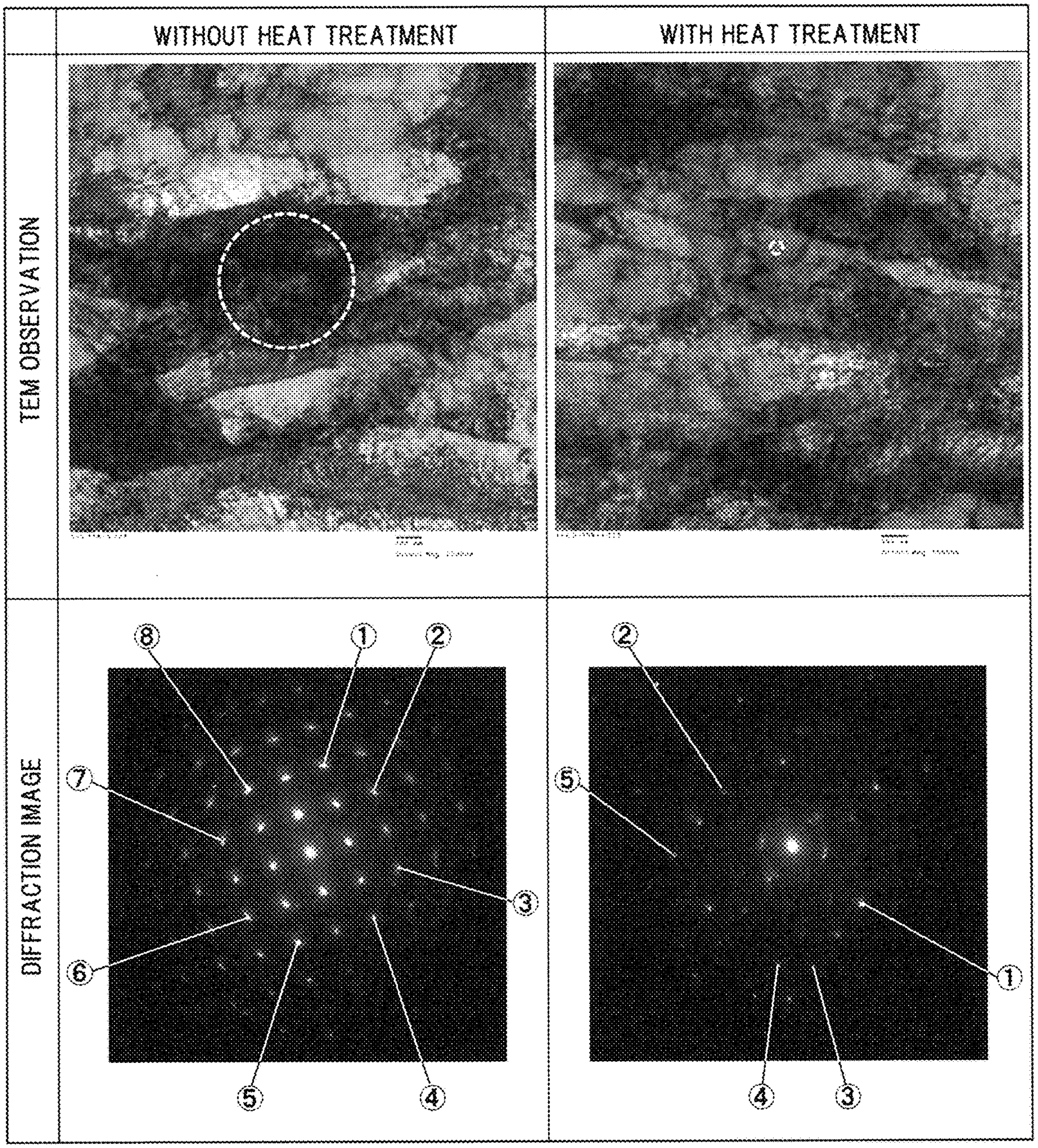
FIG. 2 shows the observation result when a structure of a conductive wire with secondary diameter before and after heat treatment is observed on TEM and diffraction images using a transmission electron microscope.

FIG. 2 shows the observation result when a structure of a conductive wire with secondary diameter before and after heat treatment is observed on TEM and diffraction images using a transmission electron microscope. A structure of a Cu—Ag alloy conductive wire having a secondary diameter of 2 mm was observed on TEM and diffraction images using a transmission electron microscope. Then, the conductive wire was heat-treated at 500° C. for 5 seconds and the structure after the heat treatment was observed on TEM and diffraction images using a transmission electron microscope. The diffraction images in FIG. 2 show the results of observing the portions surrounded by a dashed line in the TEM observation results in FIG. 2.

Diffraction Image when Heat Treatment is not Performed

Table 2 below shows the result of analyzing light intensity of diffraction image based on the observation result obtained by observing the diffraction image using a transmission electron microscope (the bottom-left photograph in FIG. 2). The diffraction image analysis method was as follows: given points on the diffraction image (eight points shown in the bottom-left photograph in FIG. 2) located at an equal distance from the center of the irradiated electron beam were selected, light intensity (Y) in a direction of a tangent of a circle having a radius equal to said distance and light intensity (X) in a direction orthogonal to the tangent direction were calculated using an image processing software (ImageJ), and a light intensity ratio (Y/X) at each point was then calculated.

TABLE 2

| Distance from Center of Irradiated electron beam | Analyzed point on Diffraction image | Light intensity (Y) in Tangent direction | Light intensity (X) in Orthogonal direction | Light intensity ratio (Y/X) |
|---|---|---|---|---|
| $L_1$ | ① | 6.85 | 1.82 | 3.76 |
| | ② | 2.10 | 1.32 | 1.59 |
| | ③ | 5.34 | 2.54 | 2.10 |
| | ④ | 1.43 | 2.16 | 0.66 |
| | ⑤ | 4.16 | 2.34 | 1.78 |
| | ⑥ | 6.86 | 1.51 | 4.54 |
| | ⑦ | 5.51 | 1.31 | 4.21 |
| | ⑧ | 4.04 | 1.42 | 2.85 |
| | | | | Average Y/X: 2.69 |

According to the observation result shown in FIG. 2 and Table 2, spots elongated into an oval shape (the light intensity ratio (Y/X) of the diffraction image is greater than 1) were observed on the diffraction image of the conductive wire before heat treatment. Based on this, it is considered that the conductive wire with secondary diameter on which heat treatment under the predetermined conditions is not performed has a metal structure in which the amount of strain generated in the process is large.

Diffraction Image when Heat Treatment is Performed

Table 3 below shows the result of analyzing light intensity of diffraction image based on the observation result obtained by observing the diffraction image using a transmission electron microscope (the bottom-right photograph in FIG. 2). The diffraction image analysis method was as follows: given points on the diffraction image (five points shown in the bottom-right photograph in FIG. 2) located at an equal distance from the center of the irradiated electron beam were selected, and a light intensity ratio (Y/X) at each point was calculated in the same manner as the diffraction image without heat treatment.

TABLE 3

| Distance from Center of Irradiated electron beam | Analyzed point on Diffraction image | Light intensity (Y) in Tangent direction | Light intensity (X) in Orthogonal direction | Light intensity ratio (Y/X) |
|---|---|---|---|---|
| $L_1$ | ① | 3.48 | 3.44 | 1.01 |
| | ② | 0.83 | 1.26 | 0.66 |
| | ③ | 0.45 | 0.92 | 0.49 |
| $L_2$ | ④ | 1.22 | 1.80 | 0.68 |
| | ⑤ | 2.60 | 2.04 | 1.27 |
| | | | | Average Y/X: 0.82 |

According to the observation result shown in FIG. 2 and Table 3, circular spots (the light intensity ratio (Y/X) of the diffraction image is about 1 to 0.6) were observed on the diffraction image of the heat-treated conductive wire. Based on this, it is considered that the conductive wire with secondary diameter heat-treated under the predetermined conditions has a metal structure in which small subgrain boundaries (sub-grains) formed by rearrangement of dislocations are present and the amount of strain generated by the process is small, and this results in that the final conductive wire (a conductive wire with tertiary diameter) contains an added metal element at a low concentration but has a conductivity of not less than 88% IACS and a tensile strength of not less than 800 MPa.

An equipment used for heat treatment is not limited and can be an electric annealer, a general resistance heating tube, or a light-reflective gold furnace, etc. The light-reflective gold furnace is desirable since a clean environment is required for processing ultra-fine wires.

Second Diameter Reduction Process

In the second diameter reduction process, the conductive wire with secondary diameter after reducing tensile strength is reduced in diameter by processing, e.g., cold drawing, to a logarithmic strain (a processing strain) of 7.8 to 12.0 ($\ln\{\pi d_0^2/4\}/\{\pi d^2/4\}=2\ \ln(d_0/d)$, where do is strain intensity before the diameter reduction process and d is strain intensity after the diameter reduction process), and a conductive wire with tertiary diameter is thereby obtained. The tertiary diameter is, e.g., preferably not less than 13 μm and not more than 40 μm, more preferably not less than 16 μm and not more than 40 μm. The processing method which can be used in the second diameter reduction process is cold drawing, hot drawing, warm drawing or cold rolling, etc., in the same manner as the initial diameter reduction process.

The processing strain needs to be 7.8 to 12.0, desirably 7.8 to 11.0, in terms of logarithmic strain. When more than 12.0, conductivity decreases due to presence of atomic defects and, in addition, tensile strength increases only a little. When less than 7.8, an increase in tensile strength is not enough. The logarithmic strain is appropriately adjusted in the range of 7.8 to 12.0 according to the wire diameter of the conductive wire with secondary diameter. The logarithmic strain is, e.g., preferably 9.2 to 11.0 when the wire diameter of the conductive wire with secondary diameter is φ4 mm, and the logarithmic strain is preferably 7.8 to 9.7 when the wire diameter is φ2 mm Conductive Wire The conductive wire in the embodiment of the invention is formed of a conductive alloy material containing not more than 1.0 mass % of an added metal element and has a conductivity of not less than 88% IACS and a tensile strength of not less than 800 MPa. It is a conductive wire which is formed of, e.g., a Cu—Ag containing not less than 0.5 mass % and not more than 1.0 mass % of Ag in tough pitch copper, oxygen-free copper or high-purity copper and has a conductivity of not less than 88% IACS and a tensile strength of not less than 800 MPa. The materials preferable as the conductive alloy material are as described above.

The conductive wire in the embodiment of the invention can be manufactured by the above-described method for manufacturing a conductive wire in the embodiment of the invention. The preferable Ag concentration when using a Cu—Ag alloy as the conductive alloy material is as described above. In a preferred embodiment, the conductive wire has a conductivity of not less than 88.5% IACS and a tensile strength of not less than 830 MPa. In a more preferred embodiment, the conductive wire has a conductivity of not less than 89% IACS and a tensile strength of not less than 850 MPa. There are no specific upper limits but, for example, conductivity is not more than 95% IACS and tensile strength is not more than 950 MPa.

According to the embodiment, a conductive wire formed of a conductive alloy material (e.g., a Cu—Ag alloy) and having a diameter of not more than 40 μm (i.e., the conductive wire with tertiary diameter) can have a conductivity of not less than 88% IACS and a tensile strength of not less than 800 MPa even when a metal element (e.g., Ag, etc.) added to a main constituent metal element (e.g., Cu, etc.) of the conductive alloy material is contained at a low concentration, hence, the conductive wire in the embodiment of the invention is excellent in economic efficiency. It is particularly beneficial in that the conductive wires having a tertiary diameter of 40 μm, 30 μm, 20 μm and 16 μm can have a conductivity of not less than 88% IACS and a tensile strength of not less than 800 MPa. For example, a φ30 μm conductive wire can have a tensile strength of 816 MPa and a conductivity of 89.4% IACS, a φ20 μm conductive wire can have a tensile strength of 862 MPa and a conductivity of 92.6% IACS, and a φ16 μm conductive wire can have a tensile strength of 845 MPa and a conductivity of 89.9% IACS.

The conductive wire in the embodiment of the invention (the conductive wire with tertiary diameter) may be plated with, e.g., Ag, Sn, Ni, Sn—Pb or Pb-free solder of Cu—Sn—Bi, Cu—Sn—Ag or Cu—Sn—Ag—P, by electroplating or hot-dipping. The plating is preferably applied after the heat treatment which is performed to reduce tensile strength.

Figure 3:
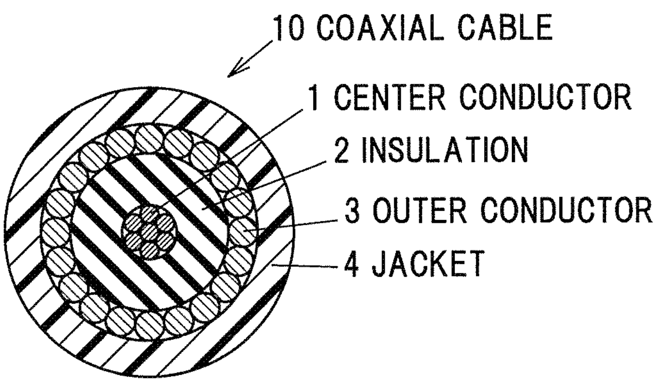
FIG. 3 is a cross sectional view showing an example of a cable in the embodiment of the invention (a coaxial cable having a center conductor formed using the conductive wire in the embodiment of the invention)
Figure 4:
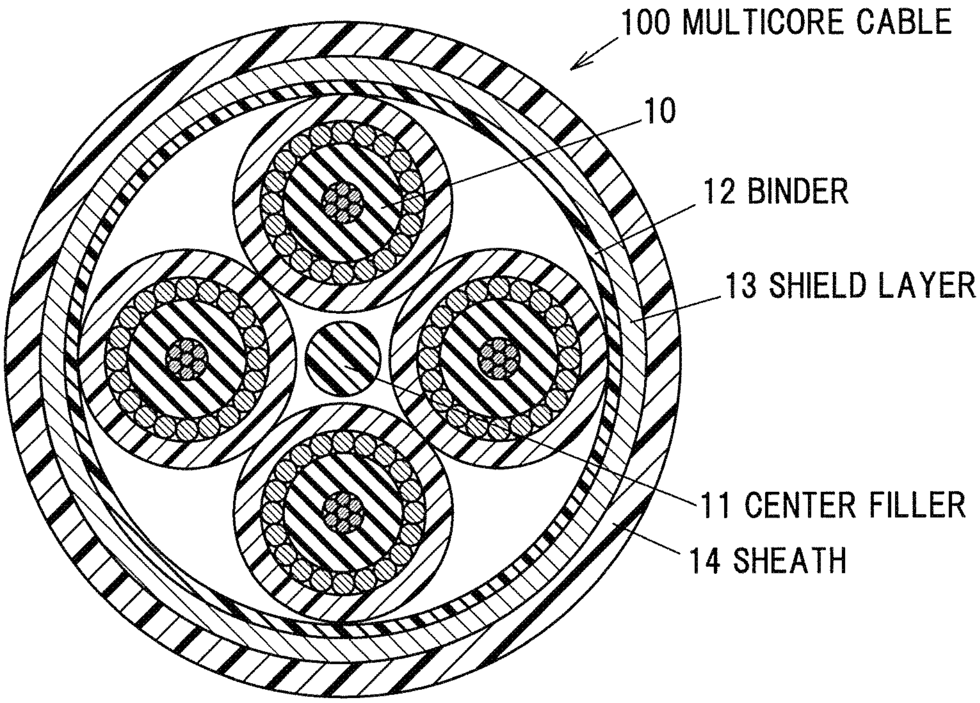
FIG. 4 is a cross sectional view showing an example of a cable in the embodiment of the invention (a multicore cable using the coaxial cables in FIG. 3)
Figure 5:
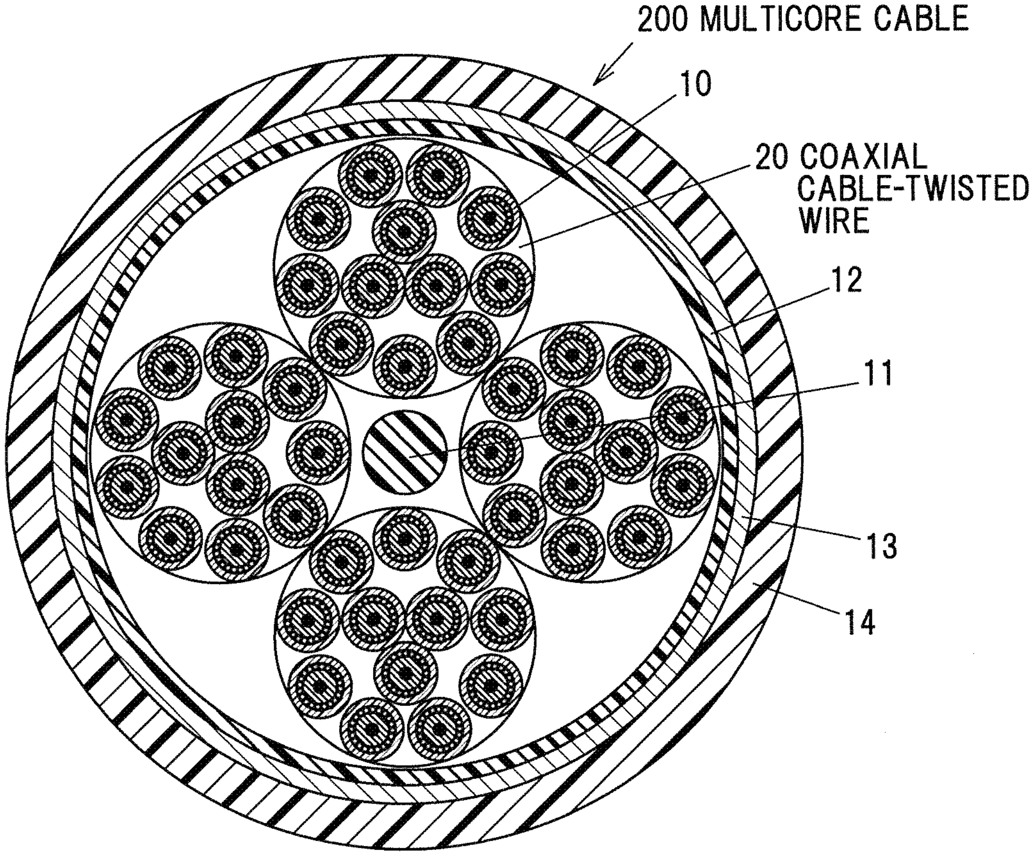
FIG. 5 is a cross sectional view showing an example of a cable in the embodiment of the invention (a multicore cable using the coaxial cables in FIG. 3)

The conductive wire in the embodiment of the invention is suitable as conductor of various cables as shown in FIGS. 3 to 5, and is suitably used for, e.g., coaxial cables including medical probe cable, endoscope cable and TV/mobile device cable, cabling for information and communications equipment, and power transmission device cable.

FIG. 3 shows an example of a coaxial cable having a center conductor formed using the conductive wire in the embodiment of the invention. A coaxial cable 10 shown in FIG. 3 has a center conductor 1, an insulation 2 provided around the center conductor 1, an outer conductor 3 provided around the insulation 2, and a jacket 4 provided around the outer conductor 3.

When the conductive wire in the embodiment of the invention is used to form the center conductor 1 of the coaxial cable 10 shown in FIG. 3, for example, a twisted wire formed by twisting plural (seven in FIG. 3) conductive wires is heat-treated. The center conductor 1 composed of twisted strands and having a conductivity of not less than 92% IACS is thereby obtained.

The insulation 2 provided around the center conductor 1 is formed of, e.g., a fluorine resin such as tetrafluoroethylene perfluoroalkyl vinyl ether copolymer (PFA). Meanwhile, the outer conductor 3 provided around the insulation 2 is formed by, e.g., spirally winding hard drawn copper wires or copper alloy wires having an elongation of not less than 1%. The jacket 4 further provided around the outer conductor 3 is formed of, e.g., a fluorine resin such as tetrafluoroethylene perfluoroalkyl vinyl ether copolymer (PFA).

FIG. 4 shows an example of a multicore cable using the coaxial cables 10 in FIG. 3. A multicore cable 100 shown in FIG. 4 is provided with, e.g., a coaxial cable-twisted wire formed by twisting plural (four in the drawing) coaxial cables 10 shown in FIG. 3 together with a center filler 11 or a tension member, a binder 12 (tape, etc.) provided around the coaxial cable-twisted wire, a shield layer 13 provided around the binder 12, and a sheath 14 provided around the shield layer 13. The coaxial cable-twisted wire may be configured that the coaxial cables 10 are not twisted with the center filler 11 or the tension member.

The shield layer 13 is formed by braiding or spirally winding plural metal strands, and the sheath 14 is formed of a tetrafluoroethylene perfluoroalkyl vinyl ether copolymer (PFA), a tetrafluoroethylene-hexafluoropropylene copolymer (FEP), a tetrafluoroethylene-ethylene copolymer (ETFE) or polyvinyl chloride (PVC), etc.

FIG. 5 shows an example of another multicore cable using the coaxial cables 10 in FIG. 3. A multicore cable 200 shown in FIG. 5 is provided with, e.g., a second coaxial cable-twisted wire formed by twisting plural (four in FIG. 5) first coaxial cable-twisted wires 20, each formed by twisting plural (twelve in FIG. 5) coaxial cables 10 shown in FIG. 3, together with the center filler 11 or a tension member, the binder 12 provided around the second coaxial cable-twisted wire, the shield layer 13 provided around the binder 12, and the sheath 14 provided around the shield layer 13. The coaxial cable-twisted wire may be configured that the coaxial cables 10 are not twisted with the center filler 11 or the tension member. In addition, the shield layer 13 and the sheath 14 of the multicore cable 200 shown in FIG. 5 can be the same as those of the multicore cable 100 shown in FIG. 4.

Casting Conductive Wire

Figure 6:
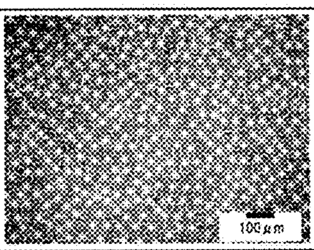
FIG. 6 shows photographs of the cross sections of casting conductive wires having a mesh sectional structure (Nos. 1 to 5) and a conventional casting conductive wire (No. 6).
Figure 6:
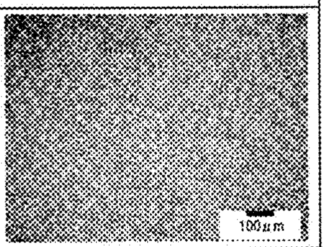
Figure 6:
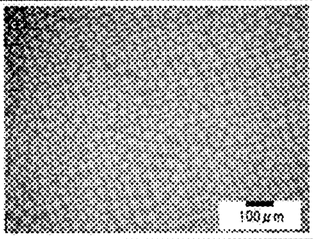
Figure 6:
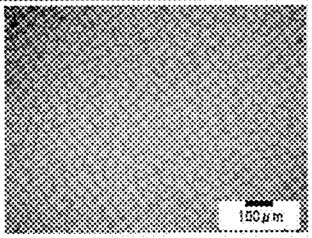
Figure 6:
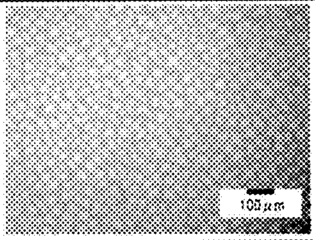
Figure 6:
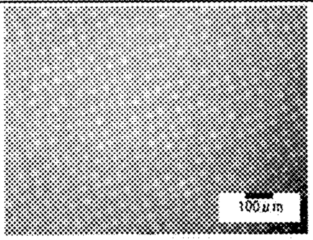
Figure 6:
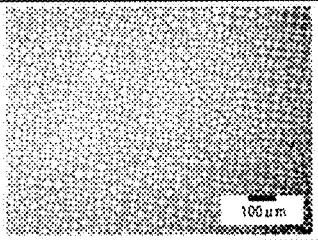
Figure 6:
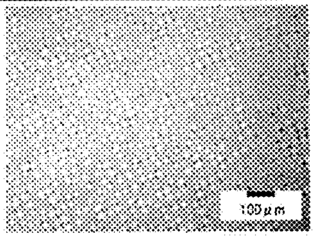
Figure 6:
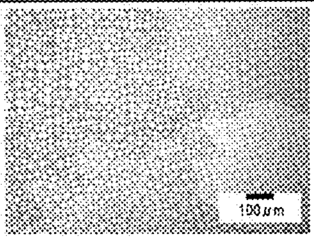
Figure 6:
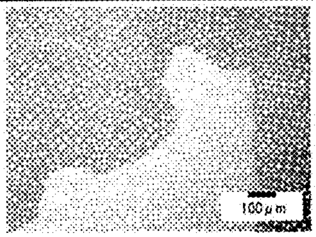
Figure 6:
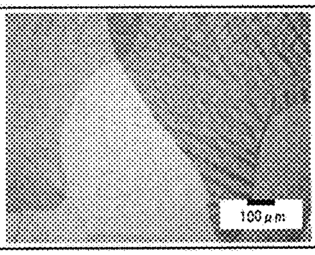

A casting conductive wire in the embodiment of the invention, when manufactured using a Cu—Ag alloy as the conductive alloy material, has a mesh sectional structure in the Cu—Ag alloy which has an Ag concentration of not less than 0.5 mass % and not more than 1.0 mass %. The structure is not a simple dendrite structure but is a mesh structure as shown in FIG. 6 (described later).

The casting conductive wire in the embodiment of the invention can be manufactured in accordance with the above-described method for manufacturing a conductive wire in the embodiment of the invention.

The casting conductive wire in the embodiment of the invention is used to manufacture the conductive wire in the embodiment of the invention.

EXAMPLES

The invention will be described in more detail below in reference to Examples. However, the invention is not limited thereto.

Casting Conductive Wire

FIG. 6 shows photographs of the cross sections of casting conductive wires having a mesh sectional structure (Nos. 1 to 5) and a conventional casting conductive wire (No. 6).

With the casting method, the Ag concentration in the Cu—Ag alloy and the casting rate shown in FIG. 6, 8 mm-diameter casting conductive wires (wire rods) were made. The copper used was oxygen-free copper with an oxygen concentration of not more than 10 ppm. The casting method A in the drawing is continuous casting and the casting method B is casting using a casing mold.

In detail, the continuous casting was performed as follows: each Cu—Ag alloy was vacuum melted using a carbon casting mold with a copper member of water cooling structure provided on the outer side and was subjected to a continuous casting in an argon atmosphere into a φ8 mm wire rod. The "front end" in FIG. 6 is a winding-start end of the wire rod and the "back end" is a winding-termination end of the wire rod.

A mesh structure was observed in all the samples Nos. 1 to 5 shown in FIG. 6 which were subjected to a continuous casting at a casting rate in the range of not less than 40 mm/min and not more than 200 mm/min. It is considered that a solid solution was not formed a lot since segregation effectively occurs even though the Ag concentration was below the solid solubility limit. In addition, the similar mesh structure was observed on the front and back ends as shown in FIG. 6. Based on this, it is considered that the casting conductive wires in the embodiment of the invention have a mesh structure uniformly along the longitudinal direction of the casting conductive wire.

On the other hand, a mesh structure was not observed in the conventional comparative material (the sample No. 6) as shown in FIG. 6 which was cast using a casting mold at a casting rate of 3600 mm/min. It is considered that a solid solution was formed since the Ag concentration was below the solid solubility limit.

Conductive Wire

Conductive wires were made using the casting conductive wires obtained as described above.

In detail, the obtained casting conductive wires (the φ8 mm wire rods formed of a Cu—Ag alloy) were reduced in diameter by cold drawing to φ4 mm-φ2 mm, and were then cold-drawn again after heat treatment at 500° C. for 5 seconds, or without performing heat treatment, to a processing logarithmic strain of 7.8 to 12.4, thereby obtaining conductive wires of φ0.04 mm to φ0.016 mm (the conductive wires with tertiary diameter). Tensile strength of the conductive wires was measured before and after the heat treatment by the following method. The tensile strength after the heat treatment was 91% to 92% of tensile strength before the heat treatment.

Conductivity and tensile strength of the obtained conductive wires were measured by the following methods. The conductive wires which passed the tests of both properties were rated as Pass (○) in the overall evaluation.

Conductivity

Electric resistance of the obtained conductive wires at 20° C. was measured by a DC four-terminal method and conductivity was calculated. The samples having a conductivity of not less than 88% IACS were evaluated as Pass (○).

Tensile Strength

Samples were taken from the conductive wires with tertiary diameter obtained as described above, and tensile strength of the samples was measured in a tensile test conducted by a test method in accordance with JIS Z2241. The samples having a tensile strength of not less than 800 MPa were evaluated as Pass (○).

TABLE 4

Treatment conditions and evaluation result

| No | Ag concentration mass % | Heat treatment 500° C., 5 seconds | Logarithmic strain | Conductivity (% IACS) | Tensile strength (MPa) | Overall evaluation |
|---|---|---|---|---|---|---|
| 1 | 2 | Not treated | 10.6-12.4 | X | ○ | X |
| 2 | 2 | Treated | 10.6-12.4 | X | ○ | X |
| 3 | 1 | Not treated | 10.6-12.4 | X | ○ | X |
| 4 | 1 | Treated | 9.2-11.0 | ○ | ○ | ○ |
| 5 | 0.75 | Not treated | 10.6-12.4 | X | ○ | X |
| 6 | 0.75 | Treated | 7.8-9.7 | ○ | ○ | ○ |
| 7 | 0.75 | Treated | 8.6-10.5 | ○ | ○ | ○ |
| 8 | 0.75 | Treated | 9.2-11.0 | ○ | ○ | ○ |
| 9 | 0.5 | Not treated | 10.6-12.4 | ○ | X | X |
| 10 | 0.5 | Treated | 9.2-11.0 | ○ | ○ | ○ |
| 11 | 0.4 | Not treated | 10.6-12.4 | ○ | X | X |

The invention is not intended to be limited to the embodiment and Examples, and the various kinds of modifications can be implemented.

What is claimed is:

1. A conductive wire, comprising:

a Cu—Ag alloy consisting essentially of Ag at a concentration of not less than 0.7 mass % and not more than 0.8 mass %, the balance being Cu having an oxygen concentration of not more than 10 ppm; a conductivity of not less than 92% IACS; a tensile strength of not less than 830 MPa, and having a wire diameter of 16 μm or more and 20 μm or less, wherein the conductive wire is heat treated between about 450° C. to 550° C. for not less than 2 seconds and not more than 10 seconds.

2. A cable, comprising the conductive wire according to claim 1.

3. The conductive wire according to claim 1 having a logarithmic strain of between 7.8 and 12.0.

4. The conductive wire according to claim 1 wherein the Ag concentration is not less than 0.75 mass % and not more than 0.8 mass %.

5. The conductive wire according to claim 1, wherein when diffraction images are observed using an electron microscope, for each of the diffraction images located at an equal distance from a center of an irradiated electron beam, an average value of light intensity ratio (Y/X) of a light intensity (Y) in a tangent direction of a circle having a radius equal to the distance to a light intensity (X) in a direction orthogonal to the tangent direction is 0.6 or more and 1 or less.

6. A casting conductive wire, comprising a Cu—Ag alloy consisting essentially of Ag at a concentration of not less than 0.7 mass % and not more than 0.8 mass %, the balance being Cu having an oxygen concentration of not more than 10 ppm; a conductivity of not less than 92% IACS, a tensile strength of not less than 830 MPa, and a mesh structure in a cross section thereof at both a front end and a back end, wherein the conductive wire is heat treated between about 450° C. to 550° C. for not less than 2 seconds and not more than 10 seconds.

7. The casting conductive wire according to claim 6 wherein the casting conductive wire is heat treated for 500° C. for 5 seconds.

8. The casting conductive wire according to claim 6 having a logarithmic strain of between 7.8 and 12.0.

9. The casting conductive wire according to claim 6 wherein the Ag concentration is not less than 0.75 mass % and not more than 0.8 mass %.

* * * * *